United States Patent [19]

Beiswenger

[11] Patent Number: 4,847,606
[45] Date of Patent: Jul. 11, 1989

[54] CONTROL AND DISPLAY SYSTEM

[75] Inventor: John L. Beiswenger, Salem, Wis.

[73] Assignee: Oak Industries Inc., Rancho Bernardo, Calif.

[21] Appl. No.: 89,138

[22] Filed: Aug. 25, 1987

[51] Int. Cl.$^4$ .............................................. G09G 3/36
[52] U.S. Cl. .................................... 340/712; 340/784; 340/765; 341/31
[58] Field of Search .................... 340/712, 784, 365 P; 350/330, 331 R, 332, 345; 250/221; 341/31

[56] References Cited

U.S. PATENT DOCUMENTS

| | | |
|---|---|---|
| 3,056,030 | 9/1962 | Kelchner . |
| 3,372,789 | 3/1968 | Thiele et al. . |
| 3,373,287 | 3/1968 | Holzer . |
| 3,398,290 | 8/1968 | Basehore et al. . |
| 3,526,775 | 9/1970 | Friedrich et al. . |
| 3,673,327 | 6/1972 | Johnson et al. . |
| 3,885,408 | 5/1975 | Clark, Jr. . |
| 3,956,745 | 5/1976 | Ellis ..................................... 340/712 |
| 4,224,615 | 9/1980 | Penz ..................................... 340/712 |
| 4,247,767 | 1/1981 | O'Brien et al. . |
| 4,267,443 | 5/1981 | Carroll et al. . |
| 4,329,581 | 5/1982 | Helfrich, Jr. et al. . |
| 4,340,813 | 7/1982 | Sauer . |
| 4,386,836 | 6/1983 | Aoki et al. ....................... 350/331 R |
| 4,387,367 | 6/1983 | Fisher . |
| 4,566,758 | 1/1986 | Bos . |
| 4,582,396 | 4/1986 | Bos et al. . |
| 4,611,889 | 9/1986 | Buzak . |
| 4,635,051 | 1/1987 | Bos . |
| 4,652,087 | 3/1987 | Bos et al. . |
| 4,670,744 | 6/1987 | Buzak . |

FOREIGN PATENT DOCUMENTS 2082427  3/1982  United Kingdom ................ 340/712

OTHER PUBLICATIONS

IBM Technical Disclosure Bulletin, "Optical Data Input Device" by Baumann et al., vol. 11, No. 10, pp. 1281 and 1282, Mar. 1969.
IBM Technical Disclosure Bulletin, "Finger Position Detect Method" by Thompson, vol. 23, No. 7B, Dec. 1980, p. 3289.

Primary Examiner—David K. Moore
Assistant Examiner—Jeffrey A. Brier
Attorney, Agent, or Firm—Kinzer, Plyer, Dorn, McEachran & Jambor

[57] ABSTRACT

A control system comprises a liquid crystal display panel; a light source; and a light detector. Light from the source is directed through at least a portion of the liquid crystal display panel to the light detector. A control circuit is provided for holding the liquid crystal display in generally opaque condition while preferably sequentially momentarily clarifying segments of the portion, whereby momentary, sequential, transversely spaced light beams are generated between the light source and the light detector. A timer and logic circuit is provided for correlating signals received from the light detector with generated, individual, spaced light beams that create the signals. Accordingly, occlusion of at least one of the individual light beams with an opaque member causes a specific characteristic response by the timer and logic circuit. In other words, when one of the individual light beams is occluded, the timer and logic circuit emits a characteristic signal which might activate a relay, send an instruction to a microprocessor, or cause some other action.

24 Claims, 4 Drawing Sheets

CONTROL AND DISPLAY SYSTEM

TECHNICAL FIELD

The invention of this application relates to an improved type of electronic control panel which is free of moving parts, and which is generally a multiple channel control system of great flexibility and versatility.

In the prior art, touch panels of various kinds are known. Particularly, touch panels for control systems may be of the capacitive, resistive, or radiant energy types. Radiant energy type touch panels typically use infrared radiation. However, each of these prior art systems, up to the present time, exhibit limitations and disadvantages. For example, the probe which must be used to activate the touch panel must be large for the radiant energy system, soft for the resistive system, and conductive for the capacitive system. In accordance with this invention any size of touch probe may be used as long as it is substantially opaque, and it does not need to be either soft of conductive.

Additionally, the system of this invention exhibits the capability for high resolution card reading, a significant advantage over other radiant systems where the resolution is low. The resistive and capacitive systems are basically without card reading capability. Also, the device of this invention is of substantially low cost, and has good mechanical stability against vibration and the like. The control of this invention can mimic a momentary push button, a touch on/touch off switch, lighted switches, and push buttons. Also slide switches and rocker action switches may be simulated as well, without the use of moving parts.

There appears to be no limitation to the fields in which the control of this invention may be used. Uses are contemplated in the field of major appliances, particularly those having "smart" microprocessor driven functions. Additionally, it may be used for similar purposes in the automotive field, the computer field, home entertainment devices such as television and stereo equipment, and other commercial equipment such as controls for vehicles and scientific equipment.

DESCRIPTION OF THE INVENTION

In this invention, a control system is provided which comprises a liquid crystal panel; a light source; light detector means; and means for directing light through at least a portion of the liquid crystal panel to the light detector means. Control means are also provided for holding the liquid crystal panel portion through which the light passes in generally opaque condition, while preferably sequentially momentarily clarifying segments of the portion.

As a result of the above, momentary, sequential, transversely spaced light beams are generated between the light source and light detector means, being spaced and sequenced by the creation of the momentarily clarified segments, typically in differing, spaced portions of the liquid crystal panel.

Timer and logic means are provided for correlating signals received from the light detector means with generated, individual, spaced light beams that create such signals. Accordingly, occlusion of at least one of the individual light beams with an opaque member causes a specific, characteristic response by the timer and logic means.

In other words, if one blocks with the finger, for example, one of the momentary, sequential, transversely spaced light beams, the remaining light beams which are transversely spaced to the light beam blocked will be received by the light detector means, and the reception of such light beams may be duly noted and processed by the timer and logic means, the identity of such light beams being recognized typically by their time of arrival at the light detector. However, the failure of the timer and logic means to receive the blocked light beam will also be recognized. This event will represent a non-standard condition, and will be duly processed by the timer and logic means as an instruction signal to activate a relay, send a signal to a microprocessor, to modify a display, or the like as dictated by the electronics of the system.

Thus, in accordance with this invention, a control system is provided in which the control is achieved by blocking one or more of an array of typically parallel, laterally spaced light beams which are created in momentary sequential manner by the momentary clarification of spaced segments of a liquid crystal panel. The cycles of momentary creation of such transient, clear segments in the liquid crystal panel (LCD) may of course be many times per second so that the parallel light beams may be substantially equivalent to a continuous light beam. Preferably, high frequency fluorescent radiation is use and sensed so that the control system may be used in ambient room light.

The light source and light detector means used in the control of this invention may be positioned within a housing. The beams of light between the light source and the light detector means may leave the housing, and may reenter the housing again, to pass across an external, exposed area. This permits selective occlusion of the beams by an opaque member such as the finger in the external, exposed area. Alternatively, mechanical instruments may be used to occlude the light beams, if desired.

Additionally, the timer and logic means may cause a display of indicia on a liquid crystal display panel, which panel may be the same as or different from the liquid crystal panel discussed above. This indicia display may correlate with the light beams to provide a visual display. Accordingly, an LCD display panel positioned behind the light beams may be connected to a microprocessor or other software as part of the timer and logic means to display what each light beam path represents or controls. Since the LCD display behind the lightbeams is electronically created, after one or more light beam paths have been selected by blocking the passage of light in the path, the microprocessor driven LCD display may change to provide a second matrix of selections. After this selection a third matrix of selections may be provided, and so on without limitation, so that an exceedingly complex series of functions may be controlled from a single control unit in accordance with this invention, limited only by the nature of the software used in the control process.

For economy of manufacture of the controls of this invention, both the light, source and the light detector means may be monolithic, i.e., they both may be simply single units that respectively emit and receive light signals of all of the spaced light beams. As stated above, identification of the individual light beams may be determined in the timer and logic means by the time of arrival of the light beam at the light detector means.

It can also be seen that there is no inherent limitation in the number of spaced, separate light beams that may be formed by the control of this invention. Thus, for a first decision, the user may be presented with several choices, represented by two, three, or more spaced light beams, identified by the correlated indicia on the liquid crystal display panel which backs up the light beams. When a certain choice is made, a next choice of a few separate light beams may be presented to the user, as controlled through the software of the timer and logic means, the control being expressed by the numbers and positions of clear, light transmissive areas which are transiently and sequentially formed in the LCD display panel that gates the light beams. Accordingly, it can be seen that a system of this type, without moving parts, exhibits great flexibility of use, with few inherent limitations on its operation.

If desired, multiple light sources may be used and multiple light detector means, being gated as before through the liquid crystal display panel in a manner controlled by the timer and control means.

If desired, a second liquid crystal panel may be provided and positioned whereby the same light can pass through clarified portions of both liquid crystal panels. The control means may also hold the second liquid crystal panel in generally opaque condition while sequentially momentarily clarifying segments of the second panel. As a result of this, individual, spaced light beams pass through clarified portions of both said panels, for less spreading of the beams at the light detector means. This provides greater precision of the control system of this invention, permitting smaller opaque objects to be used for proper control, permitting larger spaces into which the finger or other opaque object may be inserted, and the like.

Preferably, a space is provided between the liquid crystal panels for insertion of a finger or other opaque member to occlude at least one of the individual light beams.

Also, an added liquid crystal panel may be positioned to intersect added beams of light which travel in a different direction from and intersect the previously described space light beams. These added liquid crystal panels are different from, but may be used in the same apparatus as, the second liquid crystal panel described above.

Means for producing the added beams of light on one side of the added liquid crystal panel may be provided. Means for detecting the added light beams on the other side of the added liquid crystal panel are also present. These means for producing added beams of light and detecting them may constitute a separate light source and detector, or by a suitable arrangement of mirrors and electronic timing the same light source and detector as previously described may be used for both functions. The control means is capable of holding at least a portion of the added liquid crystal panel in generally opaque condition while sequentially momentarily clarifying segments of the added liquid crystal panel portion in a manner that correlates with the pattern of momentarily clarified segments of the added liquid crystal panel portion in a manner that correlates with the pattern of momentarily clarified segments of the other liquid crystal panel portion. The means for detecting the added light beams is in electronic communication with the timer and logic means.

As a result of this, such a control system is capable of detecting the position of one or more opaque objects such as a finger on a two dimensional grid across which the light beams described above intersect. By appropriate timing of the intersecting light beams this becomes possible, because of the intersecting light beams which provide two dimensional information as to the location of the finger. Accordingly, varying electronic responses may be initiated depending upon the position of the finger or other opaque object.

In short, the control system of this invention can be used to display a large, two dimensional grid with many potential finger positions, for example a matrix of 100 positions in 10 rows of 10 positions each. As before, the matrix may be displayed to the user by a liquid crystal display panel, which is driven by the software of the system. If the user touches the displayed position number 64 out of 100 positions, a characteristic electronic response can be provided which is completely different from the electronic response that would be provided if the user were to touch position number 3.

Then, as before, after a selection or series of selections has been made, the liquid crystal display panel which backs the two dimensional field may change to an entirely different display,, providing the user with further decisions, or communicating information to him, or any other response desired.

While the term "liquid crystal display panel" is used in some places above, it is to be understood that the liquid crystal panels used in this invention do not necessarily display anything, but rather are used as gates for light in the manner described above. The term "liquid crystal display panel" is not intended to absolutely mandate the existence of a display function to liquid crystal panels used in this invention, although the presence of a display function on part of a liquid crystal display panel, along with a gating function on another part of the same panel, is a desirable feature in many embodiments.

DESCRIPTION OF SPECIFIC EMBODIMENTS

Referring to FIGS. 1 through 4, control system 10 is disclosed including a housing 12 that may be mounted on a vehicle dashboard or the panel of an appliance or any other device. Housing 12 defines a depressed wall area 14 which is typically made of transparent material, as is often the entire front wall 16 of housing 12. Rear housing portion 18 is provided to enclose the components of control system 10. Light source 20 may be a simple, elongated fluorescent light bulb shown in cross-section in FIG. 2, and extending substantially the entire width of housing 12.

Figures 1, 2, 7:
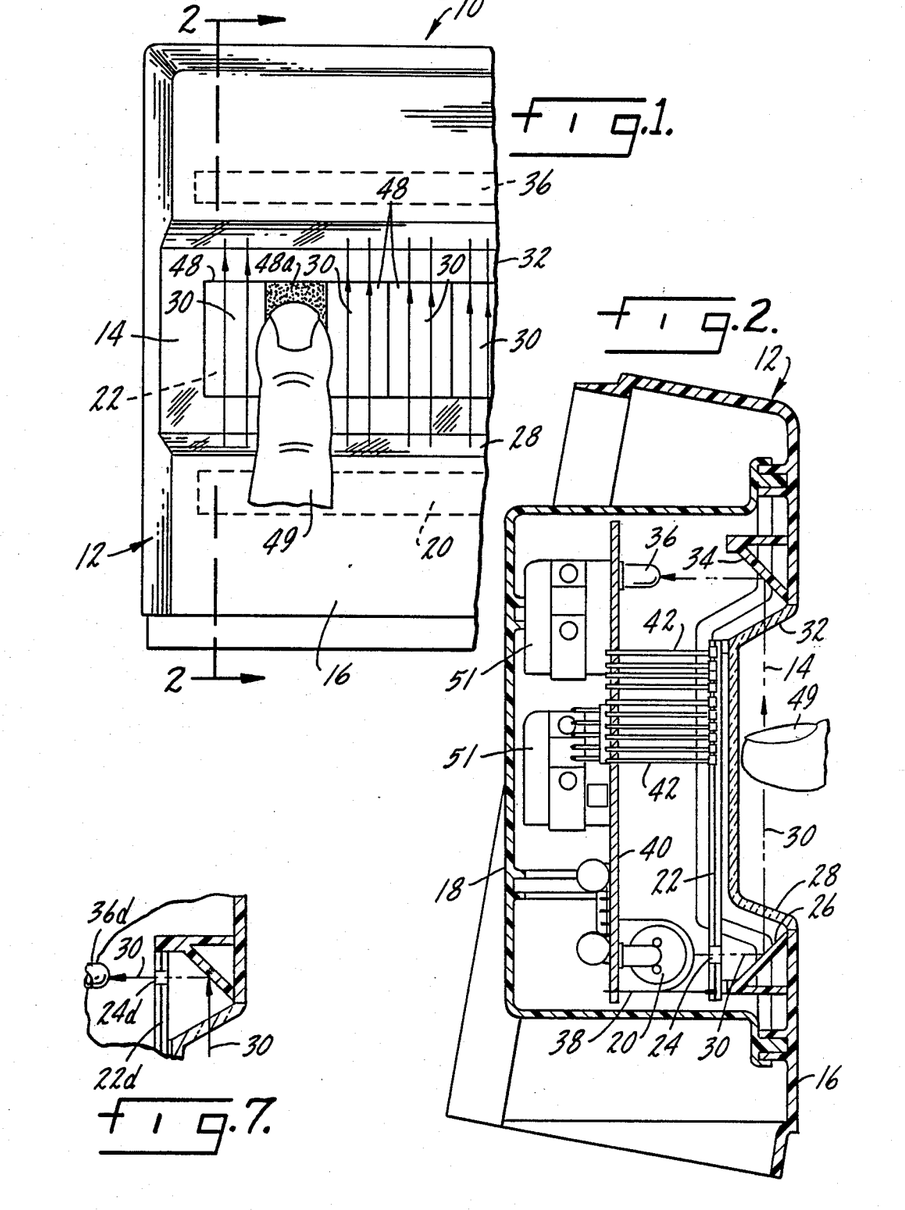
FIG. 1 is a partial elevational view of a control system in accordance with this invention.
FIG. 2 is a sectional view taken along line 2—2 of FIG. 1.
FIG. 7 is a modification of a portion of FIG. 2.

Liquid crystal display panel 22 may be of conventional design, being positioned behind transparent recessed wall 14 as shown in FIG. 2 and also blocking the forward paths of light from light source 20. Accordingly, liquid crystal display panel 22 can form one or more transparent window sections,.24 in that portion of panel 22 which can otherwise block light from traveling forward from light source 20. Such light passes through windows 24 of liquid crystal display panel 22 forwardly, to be reflected 90 degrees by mirror portion 26. The light then passes through transparent wall portion 28 of housing 12, normally passing through angled transparent wall 28 into the recess adjacent wall 14. Normally, light beam 30 passes through transparent, angled wall 32 of housing 12 to be reflected again by 90 degrees off of angled mirror 34, to pass into light detector means 36, which may be a photovoltaic cell, a phototransistor, a light dependent resistor, or any other conventional light receptor.

An array of LCD control wires 38 permit window portions 24 of liquid crystal display panel (LCD) 22 to be selectively clarified or rendered opaque to gate the light from source 20. As shown in FIG. 1, a series of separate, sequentially spaced in both time and space, light beams 30 may thus pass through the depressed space along wall 14 in a manner which is controlled by the respective window portions 24 of LCD 22, as specifically controlled by LCD wires 38.

The timer and logic means of control system 10 includes a microprocessor board 40 which is in electrical connection with light detector 36, LCD control wires 38, and LCD display wires 42 (some being deleted for clarity). Wires 42 are connected in a two dimensional matrix across LCD 22 for controlling visual displays of the LCD in a manner controlled by microprocessor 40.

Accordingly, one may display through surface 14 any desired image, as exemplified in FIG. 1. Specifically, a series of rectangular areas 48 have been defined by liquid crystal display 22, as controlled by microprocessor board 40 and LCD display wires 42. When one inserts the finger 49 into the trough as shown in FIG. 1 to occlude one of the beams of light 30, the timer and logic means identifies the particular light beam, gated by a particularly positioned and timed transient window 24 in LCD 22. Each light beam 30 is identified by its time of arrival, or failure to arrive, at detector 36. As a response, one of the areas 48, particularly 48a is fully highlighted to indicate occlusion of the light beam and selection of that area. At the same time, a characteristic electronic signal may be sent out of the control system to accomplish its predetermined purpose such as starting a motor, actuating a computer function of the like.

The light beams 30 may be gated to be 1 millisecond, sequential pulses, for example, so that a repeating cycle of light beam generation may take place many times per second.

Since the remaining timed beams of light 30 in the display as shown in FIG. 1 have not been occluded, the timer and logic means reflects that condition, and the specific characteristic signals which their occlusion would initiate do not take place.

Relays 51 may be present, being controlled by the system for desired responses upon actuation.

Figure 3:
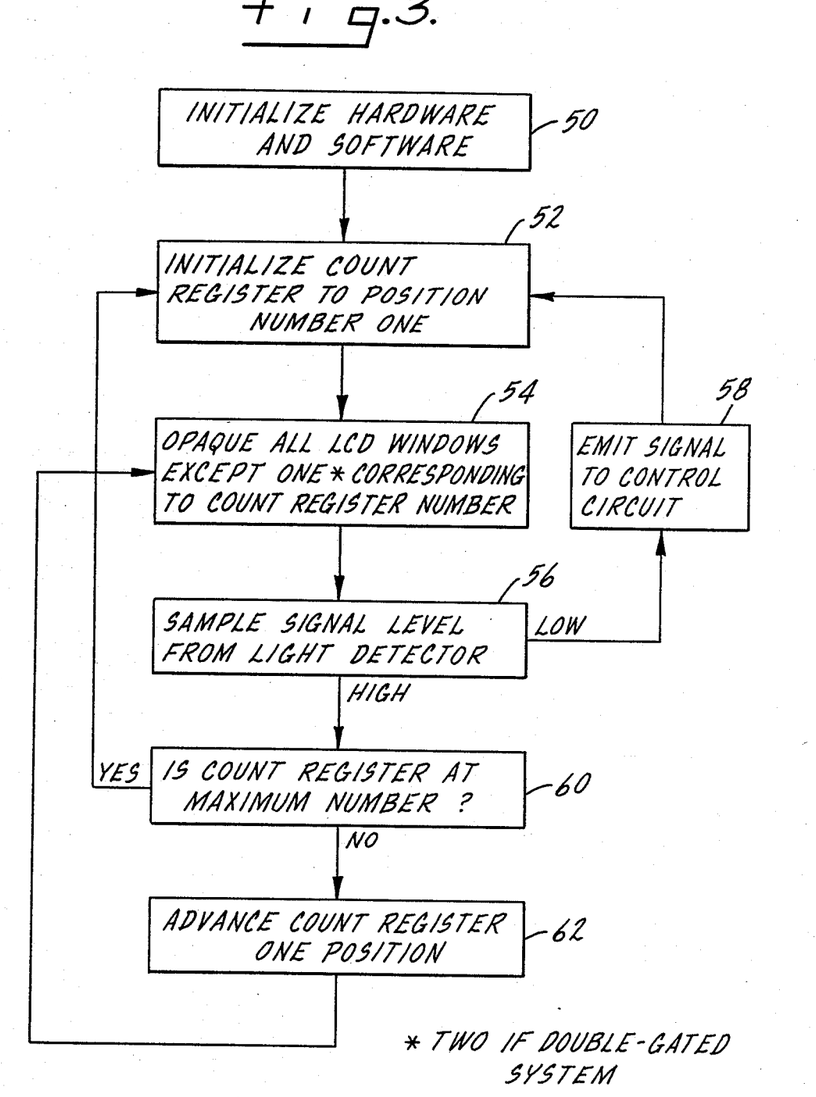
FIG. 3 is a flow chart showing the functions of the timer and control means for operation of the control system in accordance with this invention.
Figure 4:
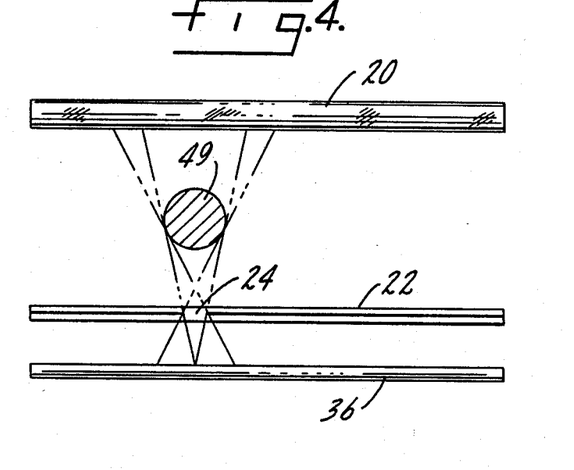
FIG. 4 is a diagrammatic view of a switch system in accordance with this invention and FIG. 1, using a single liquid crystal panel for gating.

FIG. 4 is a purely schematic diagram, illustrating a portion of the functioning of the embodiment of FIGS. 1 through 3. It can be seen that elongated light source 20 illuminates light in many directions, some of which pass through a specific, momentarily clarified window 24 in LCD 22 to impinge upon photodetector 36. It can be seen that the presence of finger 49 occludes these light beams to at least reduce the amount of light getting to the photodetector. If the finger is close to window 24, the light can become completely occluded, but, at least, a characteristic reduction of light to the photodetector can be achieved to cause the desired actuation, in conjunction with the proper timing as sensed by the timer and logic means.

FIG. 3 shows a flow chart of functions that may be built into the timer and logic means for operation of the device of FIGS. 1 through 4. The initial step 50 is basically to turn on the system and prepare it to function. The next step 52 positions a count register to position number 1. The next step 54 causes all LCD windows 24 to become opaque except for the window which corresponds to the particular count register number, each of the clarifiable windows 24 being assigned a count register number. In the double-gated system to be described below, two windows are kept open, but otherwise the same flow chart may be used. Following this, step 56 is to sample the signal level from photodetector 36. If the signal level is below a characteristic value, a signal is emitted 58 to the control circuit to cause the system to cycle back to step 52. If the signal level is at or above the particular value, the system determines (60) if the count register is at a maximum number corresponding to the last LCD window 24 to be opened. If so, the system recycles again to step 52. If not, the count register is advanced (62) by one position, and the system recycles to step 54.

Figure 6:
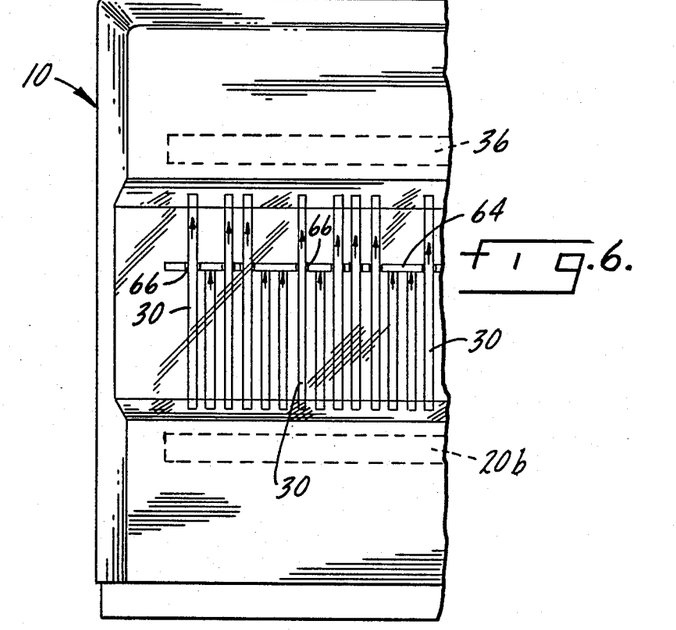
FIG. 6 is an elevational view of the control system of FIG. 1 in the process of generating a different pattern of spaced light beams, which beams are being selectively occluded by a control card in said beams for a complex control process.

Turning to FIG. 6, a more complex use of the system of FIGS. 1 through 4 is disclosed. Control system 10 is shown, with the respective plurality of sequential light beams 30 being shown, passing across LCD 22 as illustrated in FIGS. 1 and 2. Optical card 64 is provided, being positioned in a predetermined manner to intersect light beams 30. Optical card 64 is opaque, having a series of transparent portions 66 through which light beams 30 can pass. Thus, optical card 64 selectively occludes some of the light beams 30, and allows others of them to pass. By this, complex information can be quickly transmitted from the card though the control system of this invention to a computer or other device. For example, complex data for a computer operated milling machine might be transferred in this manner, or programming information, or any other desired information.

Thus, by the sequential creation of light beams 30, perhaps 0.001 second apart, gated by LCD 22, a complex pattern of information can be created using a single, constant light source 20 and a single receptor 36. Each individual light beam 30 is identified by its time of arrival at receptor 36, while its failure to arrive is used as positive signal.

Figure 5:
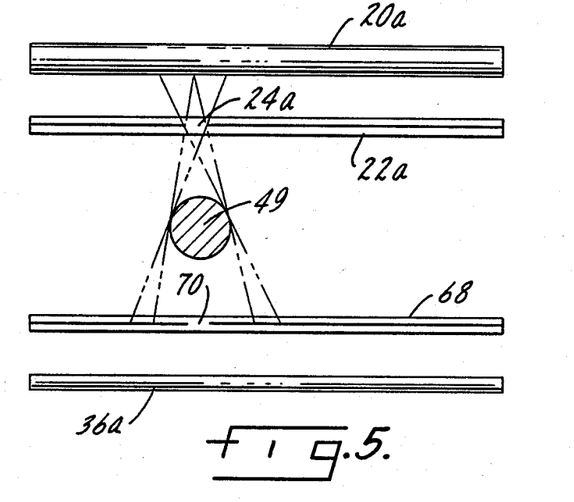
FIG. 5 is a diagrammatic view of a switch system in accordance with this invention using a pair of liquid crystal panels as gates.

Turning now to FIG. 5, a modification of the embodiment of FIGS. 1 through 4 is disclosed. Apart from the modifications shown, the system may be constructed and may operate in the manner of the previous embodiment.

Light source 20a is provided, and may be identical to the previous light source 20. Photodetector 36a may be similar in structure and function to the previous photodetector 36, and LCD 22a may also be substantially identical in structure and function to the previous LCD 22.

However, in this circumstance, a second liquid crystal panel 68 may be provided, which may or may not have a display function, but does have a gating function. It, as well as LCD 22a is connected to the timer and logic means to produce an intermittent sequential, transient array of momentarily clarified segments of the normally opaque liquid crystal panel 68. Typically, windows 70 may be sequentially created in the same order and corresponding position to windows 24a of liquid crystal panel 22a, which in turn are similar in function to windows 24 of the previous embodiment.

Accordingly, spreading of light beams at the light detector means 36a is greatly reduced, so that greater precision can be achieved, and a larger spacing may be provided for the finger 49 or other opaque object used to occlude the light beams. It can be seen from FIG. 5 that the use of this double gating concept permits the complete occlusion of light at detector 36a, even though a unitary, elongated light source 20a and detector 36a are used, so that a matrix of control positions may be provided by the control system. When this is compared with FIG. 4, it can be seen that, there, some light may get through to detector 36 even when the finger is in position, while that situation is much less likely in the configuration of FIG. 5.

Figure 8:
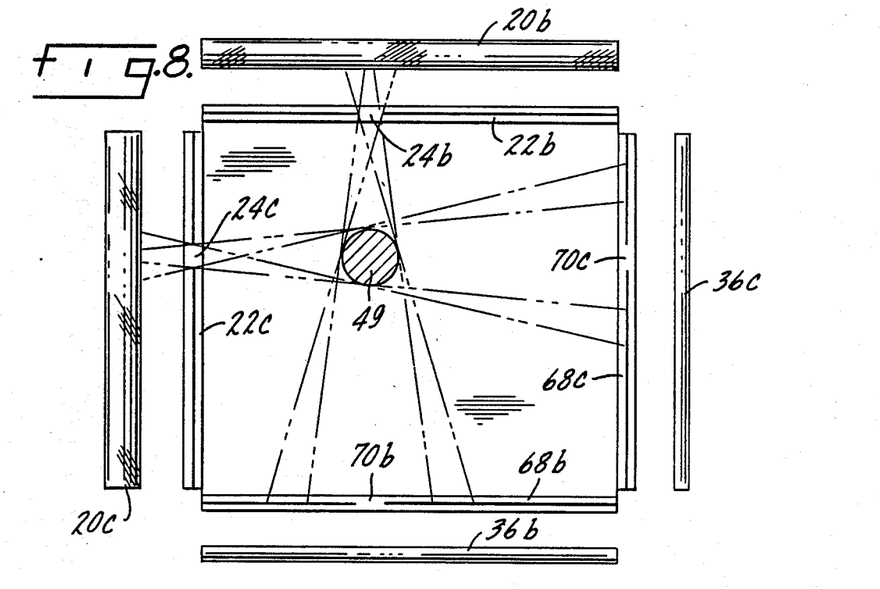
FIG. 8 is a diagrammatic view of another embodiment of the control system of this invention in which the position of an inserted opaque object may be located by the control system in a two dimensional field or grid.

Turning now to FIG. 8, this embodiment may also be similar in structure and function to the previous embodiments except as otherwise disclosed. As before, a light source 20b, photodetector 36b, liquid crystal display 22b and second liquid crystal display 68b may function in the manner described with respect to the previous embodiment.

As an improvement of this application, a second system is provided, being positioned at an angle to the first system 20b, 22b, 68b, 36b. Specifically, the angle is shown to be substantially 90 degrees to the first system, but other angles may be used as desired. The second system comprises a light source 20c, a pair of liquid crystal panels 22c, 68c, and a photodetector 36c, each of which may be of a structure and function which is substantially identical to the analogous parts of identical number in the previous embodiments.

Thus, the embodiment of FIG. 8 is a double detection system in which gated intersecting beams of light are separately detected. As before, the transient, sequential clarified windows 24b, 24c, 70b, 70c which are formed are correlated in the sequence and pattern of their formation. However, in this instance, windows 24b, 70b may be formed, and remain open and transmitting light while each of the series of windows 24c, 70c are transiently and sequentially formed and extinguished, as controlled by the timer and control means, then, the next, adjacent windows 24b, 70b are created and the former windows are extinguished, and, once again, the entire series of windows 24c, 70c are transiently and sequentially formed and extinguished.

By this kind of arrangement, the pattern of positive responses to light indicated by photodetectors 36b and 36c may be integrated together and, from that, the coordinates of the finger 49 or other opaque object in the two dimensional field defined between liquid crystal panels 22b, 22c, 68b, 68c may be calculated. This information may be used to make a characteristic electronic response to the placement of finger 49 at various positions in the two dimensional area, to effectively provide a two dimensional matrix of electronic selections which may be made.

As before, a liquid crystal display panel 80 may back up the two dimensional area to provide desired indicia as a guide to show where the finger should be placed for the desired selection or choice, and to also provide visual responses back to the user. With proper mirroring LCD display panel 80 may carry all windows 24b, 24c, 70b, 70c.

FIG. 7 shows a modification of the embodiment of FIGS. 1 through 4, in which liquid crystal panel 22d is modified to occlude the light beam 30 adjacent receptor 36d rather than the light source. Thus, windows 24d may be created and extinguished adjacent receptor 36d in a manner and for purposes as described above while providing improved precision of light gating and sensing. Apart from this, the structure and function of all parts may be as described above.

Accordingly, a control system is provided by this invention for an electronic control panel or the like in virtually any desired field, which panel is free of moving parts, and which has low cost of manufacture, and great flexibility and versatility.

The above has been offered for illustrative purposes only, and is not intended to limit the scope of the invention of this application, which is as defined in the claims below.

That which is claimed is:

1. A control system which comprises:
a liquid crystal panel; light source; light detector means, means for directing light through at least a portion of said liquid crystal panel to said light detector means; control means connected to said detector means and for transiently forming at least one transparent window in said liquid crystal panel at a position to permit said light to pass from said light source, through said panel, and to said light detector means, the occlusion of light passing through said panel window causing said control means to provide a control signal.

2. The control system of claim 1 in which said control means is capable of transiently forming transparent windows in said panel having differing positions on said panel to permit passage of spaced portions of said light beam.

3. A control system which comprises:
a liquid crystal panel; a light source; light detector means; means for directing light through at least a portion of said liquid crystal panel to said light detector means; control means for holding said liquid crystal panel portion in generally opaque condition while sequentially momentarily clarifying segments of said portion, whereby momentary, sequential, transversely spaced light beams are generated between said light source and light detector means; timer and logic means for correlating a signal received from said light detector means with the individual light beam that creates said signal, whereby occlusion of at least one of said individual light beams with an opaque member causes a specific, characteristic response by said timer and logic means.

4. The control system of claim 3 in which said light source and light detector means are positioned within a housing, the beams of light between said light source and said light detector means leaving said housing add reentering said housing again to pass across an external, exposed area, to permit selective occlusion of said beams by an opaque member in said external exposed area.

5. The control system of claim 3 in which said timer and logic means causes display of indicia on a liquid crystal panel section that correlates with the light beams to provide a visual display control system.

6. The control system of claim 5 in which the same liquid crystal panel serves to display said indicia and to sequentially momentarily clarify said segments.

7. The control system of claim 3 in which said light detector means is monolithic.

8. The control system of claim 3 in which said light source is monolithic.

9. The control system of claim 3 in which a second liquid crystal panel is provided and positioned whereby the same light can pass through clarified portions of both liquid crystal panels, said control means also holding said second liquid crystal panel in generally opaque condition while sequentially momentarily clarifying segments of said second panel, whereby said individual, spaced, light beams pass through clarified portions of both said panels for less spreading of said beams at said light detector means.

10. The control system of claim 9 in which a space is provided between said liquid crystal panels for insertion of an opaque member to occlude at least one of each of said intersecting individual light beams.

11. The control system of claim 3 in which an added liquid crystal panel is positioned to intersect added beams of light which travel in a different direction from and intersect said spaced light beams; means for producing said added beams of light on one side of said added liquid crystal panel; means for detecting said added light beams on the other side of the added liquid crystal panel; said control means also being capable of holding at least a portion of said added liquid crystal panel in generally opaque condition while sequentially momentarily clarifying segments of said added liquid crystal panel portion in a manner that correlates with the pattern of momentarily clarified segments of the other liquid crystal panel portion, said means for detecting said added light beams being in electronic communication with said timer and logic means, whereby the position of at least one opaque object that occludes said intersecting light beams may be located by said control system in a 2-dimensional field and varying electronic responses may be initiated depending on said position.

12. A control system which comprises:
a liquid crystal panel; a light source; light detector means; means for directing light through at least a portion of said liquid crystal panel to said light detector means; control means for holding the liquid crystal panel portion in generally opaque conditions while sequentially momentarily clarifying segments, of said portion, whereby momentary, sequential, transversely spaced light beams are generated between said light source and light detector means; timer and logic means for correlating a signal received from said light detector means with the individual light beam that creates said signal, whereby occlusion of at least one of said individual light beams with an opaque member causes a specific, characteristic response by said timer and logic means, said light source and light detector means being positioned within a housing, the beams of light between said light source and said light detector means leaving said housing and reentering said housing again to pass across an external, exposed area, to permit selective occlusion of said beams by the opaque member in said external exposed area, said timer and logic means causing a display of indicia on a liquid crystal panel section that correlates with the light beams to provide a visual display control system.

13. The control system of claim 12 in which a second liquid crystal panel is provided and positioned whereby the same light can pass through clarified portions of both liquid crystal panels, said control means also holding said second liquid crystal panel in generally opaque condition while sequentially momentarily clarifying segments of said second panel, whereby said individual, spaced, light beams pass through clarified portions of both said panels for less spreading of said beams at said light detector means.

14. The control panel of claim 12 in which an added liquid crystal panel is positioned to intersect added beams of light which travel in a different direction from and intersect said spaced light beams; means for producing said added beams of light on one side of said added liquid crystal panel; means for detecting said added light beams on the other side of the added liquid crystal panel; said control means also being capable of holding at least a portion of said added liquid crystal panel in generally opaque condition while sequentially momentarily clarifying segments of said added liquid crystal panel portion in a manner that correlates with the pattern of momentarily clarified segments of the other liquid crystal panel portion, said means for detecting said added light beams being in electronic communication with said timer and logic means, whereby the position of at least one opaque object that occludes said intersecting light beams may be located by said control system in a 2-dimensional field and varying electronic responses may be initiated depending on said position.

15. The control system of claim 14 in which said light detector means and said light source are monolithic.

16. The control system of claim 14 in which at least one liquid crystal panel serves to display indicia and also to sequentially momentarily clarify said segments.

17. The control system of claim 14 in which a space is provided between said liquid crystal panels for insertion of an opaque member to occlude at least one of each of said intersecting individual light beams.

18. A control system which comprises:
a liquid crystal panel; a light source; light detector means; means for directing light through at least a portion of said liquid crystal panel to said light detector means; control means for holding said liquid crystal panel portion in generally opaque condition while sequentially momentarily clarifying segments of said portion, whereby momentary, sequential, transversely spaced light beams are generated between said light source and light detector means; timer and logic means for correlating a signal received from said light detector means with the individual light beam that creates said signal; in which a second liquid crystal panel is provided and positioned whereby the same light can pass through clarified portions of both liquid crystal panels, said control means also holding said second liquid crystal panel in generally opaque condition while sequentially momentarily clarifying segments of said second panel, whereby said individual, spaced light beams pass through clarified portions of both said panels for less spreading of said beams at said light detector means, the occlusion of at least one of said individual light beams with an opaque member causes a specific, characteristic response by said timer and logic means; and further in which an added liquid crystal panel is positioned to intersect added beams of light which travel in a different direction from and intersect said spaced light beams, means for producing said added beams of light on one side of said added liquid crystal panel; means for detecting said added light beams on the other side of the added liquid crystal panel; said control means also being capable of holding at least a portion of said added liquid crystal panel in generally opaque condition while sequentially momentarily clarifying segments of said added liquid crystal panel portion in a manner that correlates with the pattern of momentarily clarified segments of the other liquid crystal panel portion, said means for detecting said added light beams being in electronic communication with said timer and logic means, whereby the position of at least one opaque object that occludes said intersecting light beams may be located by said control system in a 2-dimensional field and varying electronic response may be initiated depending on said position.

19. The control system of claim 18 in which a space is provided between said liquid crystal panels for insertion of an opaque member to occlude at least one of each of said intersecting, individual light beams.

20. A method of producing a series of transversely spaced, sequential beams of light by gating light through a liquid crystal panel, and sequentially momentarily clarifying spaced segments of at least a portion of said liquid panel while holding adjacent portions of said panel in generally opaque condition, and thereafter sensing said momentary, sequential, transversely spaced light beams with light detector means; correlating a signal received by said light detector means with the individual light beam that created said signal by the time which they are sensed by the light detector means.

21. The method of claim 20 including the step of occluding at least one of said individual light beams with an opaque member to cause a specific, characteristic response by said timer and logic means.

22. The method of claim 21 in which the sequentially momentarily clarifying segments of said liquid crystal panel is rapidly cycled with a frequency of more than one cycle per second.

23. An apparatus for providing a control signal including a liquid crystal panel and means for transiently forming transparent windows therein, a light source positioned to direct light through a transiently open window, a detector positioned to detect light passing through a transiently open window, timing and logic means connected to said detector and correlating the opening of said windows, whereby the occlusion of light passing through a window will cause said timing and logic means to provide a control signal representative thereof.

24. The apparatus of claim 23 further characterized by and including a second liquid crystal panel and means for transiently forming transparent windows therein, a second light source arranged on an axis intersecting the axis of said first light source and positioned to direct light through a transiently open window in said second liquid crystal panel, a second detector positioned to detect light from said second light source passing through a transiently open window in said second liquid crystal panel, said timing and logic means being connected to both of said detectors whereby the occlusion of light passing through a window in each panel will cause said timing and logic means to provide a control signal representative of the position of said occluding object along the axes of said light sources.

* * * * *

UNITED STATES PATENT AND TRADEMARK OFFICE
CERTIFICATE OF CORRECTION

PATENT NO. : 4,847,606
DATED : July 11, 1989
INVENTOR(S) : John L. Beiswenger

It is certified that error appears in the above—identified patent and that said Letters Patent is hereby corrected as shown below:

Title page, Assignee:

Delete "Oak Industries Inc., Rancho Bernardo, Calif."

Insert: "Technomarket, Inc., Chicago, Ill."

Signed and Sealed this

Tenth Day of July, 1990

Attest:

HARRY F. MANBECK, JR.

Attesting Officer    Commissioner of Patents and Trademarks